Patented Apr. 21, 1942

2,280,265

UNITED STATES PATENT OFFICE 2,280,265

LAXATIVE

Albert Regensburger, Nuremburg, Germany

No Drawing. Application December 19, 1938, Serial No. 246,671. In Germany February 3, 1938

2 Claims. (Cl. 167—56)

The object of the invention is a new palatable purgative that means particularly a laxative for the composition of which linseed is utilized, as well as a process is concerned whose purpose is the production of the said laxative.

The purgative, as it corresponds with the invention, consists of linseed that first is subjected to germination and afterwards roasted.

Purgatives which are fabricated with the aid of linseed have already been known for a long time. These laxatives, however, having an unpleasant taste, therefore are not taken with pleasure, especially not by sensitive people. In this respect it must be borne in mind the statement that the typical linseed-taste is expelled by the germination and the following torrefaction of the linseed and that the new purgative has an agreeable relish resembling the flavour of malt. At the same time the laxative effect of the product is augmented by the germination and roasting of the linseed.

The purgative effectivenesss of the linseed partly is based on a mechanical stimulation of the intestines, partly on the presence of certain chemical substances in the linseed. The mechanical excitement of the intestines is to be scribed to the influence of the indigestible linseed-husks the same being composed of stone-cells. A physiological, especially purging operativeness ought to be attributed to oils, steeping materials and amylaceous substances contained in the linseed. Through the germination the starch and the starch-like ingredients are for the greatest part transformed into dextrine and dextro-glucose. Hereby the circumstance is amazing that in consequence of the mentioned proceeding the laxative active power of the linseed is not diminished but intensified.

Regarding the production of the palatable purgative which is brought forth by means of using linseed, in accordance with the invention, there is the following method to be taken into consideration:

Linseed is spread in a moist-warm room in this manner constituting a layer, the same attaining a height of ½ to 1 cm. The degree of humidity of the air and the temperature of same during the germination is estimated in such a wise that thereof results a duration of germination of 3 to 10 days. Certain fluctuations are grounded on the different characteristic qualities of each sort of linseed. Making allowance for this fact it turns out to be to the purpose if for the germination a degree of warmth is chosen which by 10 to 15° surpasses the temperature convenient for the germination of barley.

Immediately after the germination that is to say when the linseeds have germinated in the course of 3 till 10 days, a roasting is carried into effect taking advantage of a drying-contrivance. Hereby the germs themselves for the greatest part fall off so that they can be removed. By such mode of acting the durability of the compound is increased, whereas a certain portion of germs does not cause any damage to the preparation and in some cases has proved to be satisfactory, this favourable result being the effect of the percentage of vitamins in the germs.

The germinated and torrified linseed is now ground. The product thus obtained can be directly made use of as purgative or mixed with other laxatives. Importance has also to be attached to an admixture of lime containing nutrients. The production of a liquid purgative may also be realized, if desired, by extraction of the germinated and roasted linseed. As turning the scale can on that account be thought the circumstance that by the process of germination and torrefaction the disagreeable taste of the linseed is driven out and the purging efficiency is not reduced but increased. The product created in conformity with the invention is besides all that likewise distinguished because of its having qualities of a nutrient in consequence of its proportion of sugar.

I claim:

1. Laxative, containing germinated and roasted linseeds as laxative ingredient.

2. Laxative, containing germinated, roasted, and ground linseeds as laxative ingredient.

ALBERT REGENSBURGER.